United States Patent
Fukuda et al.

[11] 3,723,008
[45] Mar. 27, 1973

[54] DIFFERENTIAL SPECTROPHOTOMETER

[75] Inventors: Kenji Fukuda; Tadashi Honkawa, both of Katsuta, Japan

[73] Assignee: Hitachi, Ltd., Tokyo, Japan

[22] Filed: Nov. 23, 1971

[21] Appl. No.: 201,454

[30] Foreign Application Priority Data

Dec. 24, 1970 Japan ..............................45/102779

[52] U.S. Cl. ........................356/88, 350/6, 350/285, 356/96
[51] Int. Cl. ..............................G01j 3/02, G01j 3/42
[58] Field of Search................356/51, 80, 88, 93-98; 350/6, 285

[56] References Cited

UNITED STATES PATENTS

| | | | |
|---|---|---|---|
| 3,080,788 | 3/1963 | Saunderson | 356/80 |
| 3,211,051 | 10/1965 | Frei et al. | 356/97 |

OTHER PUBLICATIONS

Gilgore et al., Review of Scientific Instruments Vol. 38, Pages 1535 and 1536, 1967.

Shimadzu Multipurpose Recording Spectrophotometer Model MPS-50L, Cataloque P63-026II, pages 8, 9, Received Dec. 2, 1968.

Primary Examiner—Ronald L. Wibert
Assistant Examiner—F. L. Evans
Attorney—Craig, Antonelli & Hill

[57] ABSTRACT

A beam of light passes through a sample and the transmitted light beam is detected by a detector. The light beam to be detected by the detector is a monochromatic light beam obtained by a dispersing means and the wavelength of the monochromatic light beam is continuously varied by a wavelength scanner. A transparent plate is obliquely positioned in the path of the monochromatic light beam so that the detector delivers an electrical signal representative of the absorption when the transparent plate lies in the path of the light beam and another electrical signal representative of the absorption when the transparent plate does not lie in the path of the light beam. A ratio detector or a difference detector compares these electrical signals with each other or subtracts one of these electrical signals from the other thereby obtaining a differential spectrum.

10 Claims, 6 Drawing Figures

3,723,008

DIFFERENTIAL SPECTROPHOTOMETER

BACKGROUND OF THE INVENTION

1. FIELD OF THE INVENTION

This invention relates to a differential spectrophotometer, that is, a spectrophotometer for obtaining a differential spectrum.

2. DESCRIPTION OF THE PRIOR ART

Differential spectrophotometers have been progressively used in recent years to obtain a curve representative of the relation between the wavelength λ and the linear derivative dA/dλ or dT/dλ of the light absorption coefficient A or light transmission coefficient T of a sample with respect to the wavelength λ, hence obtaining a differential spectrum. This is because the differential spectrophotometer has the following advantages:

a. Two or more absorption spectra can be individually detected even when these absorption spectra overlap each other completely or with a slight difference in wavelengths.
b. A low absorption peak existing on a very sharp absorption spectrum curve can be easily detected.
c. The highest position of a very broad peak of an absorption spectrum can be accurately determined.
d. There is generally a linear relation between the differentiated value and the concentration of a constituent to be subject to quantitative analysis. Thus, the quantitative analysis of the constituent can be reliably carried out in spite of the presence of a background.
e. The change or difference in wavelength dλ is so small that the measurement is not adversely effected by the "turbidity" of a sample.

As is well known, an apparatus for detecting the difference in wavelength dλ is required for obtaining a differential spectrum, and to this end, it is common practice to use two spectrometers. However, the apparatus using two spectrophotometers is limited in that, among others, it is very expensive and the difference in wavelength dλ remains constant only with difficulty during scanning of the wavelength.

SUMMARY OF THE INVENTION

It is an object of the present invention to provide a differential spectrophotometer which is free from the defects above described.

Another object of the present invention is to provide a differential spectrophotometer which is less expensive than when two spectrophotometers are used.

A further object of the present invention is to provide a differential spectrophotometer in which means are provided for maintaining the difference in wavelength dλ to be constant.

Another object of the present invention is to provide a differential spectrophotometer in which means are provided for freely varying the difference in wavelength dλ.

In accordance with the present invention, there is provided a differential spectrophotometer comprising means for radiating a beam of light to be passed through a sample; photoelectric conversion means for detecting the light beam passed through the sample; means including a dispersing means for dispersing the light beam disposed at a first position in the path of the light beam from said light source toward said photoelectric conversion means through the sample so that a monochromatic light beam can be separated from said light beam to be detected by said photoelectric conversion means; means for selectively positioning a transparent plate at a second position in the path of the light beam from said light source toward said photoelectric conversion means through the sample so that said transparent plate can be disposed at an angle with respect to the light beam passing through said second position thereby producing a slight difference between the wavelength of the monochromatic light detected by said photoelectric conversion means when said transparent plate is disposed at said second position and the wavelength of the monochromatic light detected by said photoelectric conversion means when said transparent plate is not disposed at said second position; means for driving said dispersing means so that said dispersing means can scan the wavelength of said monochromatic light thereby alternately deriving from said photoelectric conversion means a first electrical signal representative of the absorption of the light by the sample when said transparent plate is in said second position and a second electrical signal representative of the absorption of the light by the sample when said transparent plate is not in said second position; and means for generating a third electrical signal representative of the difference or ratio between said first and second electrical signals.

The above and other objects, features and advantages of the present invention will be apparent from the following detailed description taken in conjunction with the accompanying drawing.

DESCRIPTION OF THE PREFERRED EMBODIMENTS

Figure 1:
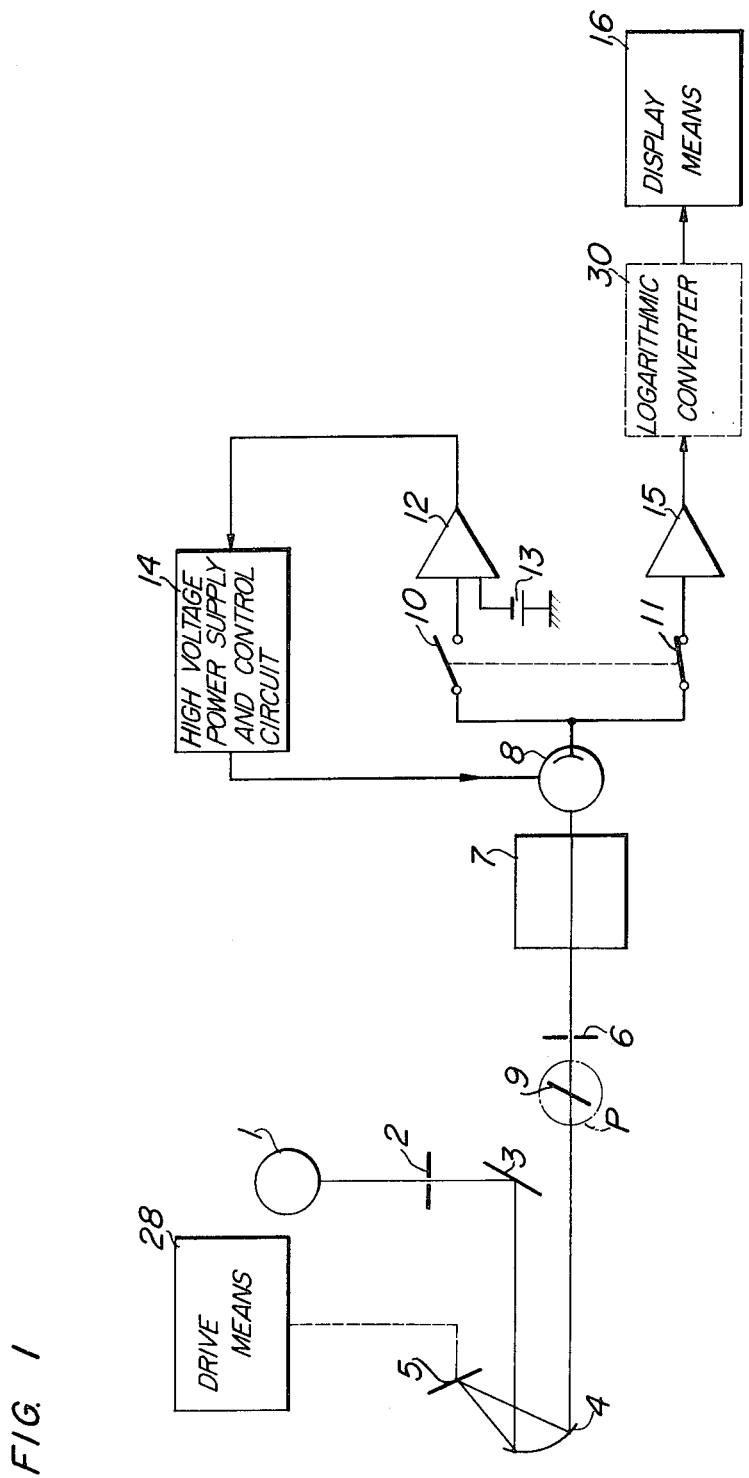
FIG. 1 is a diagrammatic view showing an embodiment of the present invention.

Referring to FIG. 1, a beam of white light emanating from a light source 1 passes through an entrance slit 2 and is projected onto a reflecting mirror 3 to be reflected thereby in a direction at right angles with respect to the original direction. The beam of white light is rendered parallel by a collimator 4 and is then projected onto a dispersing means or grating 5. The grating 5 disperses the beam of white light incident thereupon so as to separate the light beam into monochromatic light beams of different wavelengths. One of the monochromatic light beams is directed by the collimator 4 to pass through an exit slit 6 to be projected onto a sample 7. The light beam passed through the sample 7 is detected by a detector 8 which may be a photoelectric converter. The dispersing means or grating 5 is driven by a drive means 28 for scanning the wavelength. Thus, the wavelength of the light beam to be detected by the detector 8 can be varied continuously. A transparent plate 9 is disposed immediately before the exit slit 6 so that it can periodically cut across the monochromatic light beam in oblique relation thereto.

Figure 2:
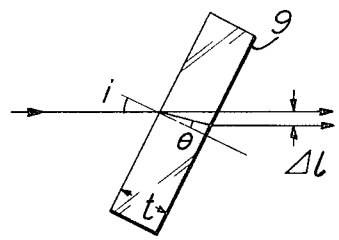
FIG. 2 is an enlarged detail view of the portion P in FIG. 1.

It will be seen from FIG. 2 showing the portion P in FIG. 1 in an enlarged scale that the monochromatic light beam enters the transparent plate 9 at an angle of incidence $i$ ($i \neq 0$) when the transparent plate 9 is in the position in which it cuts across the monochromatic light beam. Suppose now that t is the thickness of the transparent plate 9 and $\theta$ is the angle of refraction of the light beam within the transparent plate 9, then the displacement $\Delta l$ of the light beam emerging from the transparent plate 9 is given by $$\Delta l = t/\cos \theta \cdot \sin (i - \theta) \text{ mm}$$

Suppose further that the linear dispersion is D mm/mm, then the difference $\Delta \lambda$ between the wavelength when the transparent plate 9 cuts across the light beam and the wavelength when the transparent plate 9 does not cut across the light beam is given by $$\Delta \lambda = \Delta l \cdot D \text{ mm}$$

More precisely, the wavelength of the light beam detected by the detector 8 is $\lambda + \Delta\lambda$ or $\lambda - \Delta\lambda$ when the transparent plate 9 cuts across the light beam, that is, when the transparent plate 9 is positioned in the path of the light beam, where $\lambda$ is the wavelength of the light beam detected by the detector 8 when the transparent plate 9 does not cut across the light beam. Therefore, when the wavelength is scanned in the manner above described, two light beams having a difference in wavelength $\Delta\lambda$ therebetween are alternately detected by the detector 8, and the detector 8 delivers alternately two electrical signals representative of the rate of transmission of the two light beams through the sample 7 since the light transmission coefficient is a function of the wavelength.

The arrangement shown in FIG. 1 is adapted to seek the ratio between these two electrical signals. How to seek the ratio between the two electrical signals will now be described in detail. A switch 10 is closed only when the transparent plate 9 does not cross the light beam, while another switch 11 is closed only when the switch 10 is in the open position. Thus, when one of these two electrical signals or the electrical signal corresponding to the transmission of the light beam of wavelength $\lambda$ through the sample 7 appears at the output of the detector 8, this electrical signal is applied through the switch 10 to a differential amplifier 12. The differential amplifier generates an electrical signal representative of the difference between the electrical signal applied thereto and a reference signal applied from a reference power supply 13. A high voltage power supply and control circuit 14 controls the bias voltage applied to the detector 8 so that the difference signal attains a predetermined level. Then, when the switch 11 is closed, the electrical signal corresponding to the transmission of the light beam of wavelength $\lambda + \Delta\lambda$ or $\lambda - \Delta\lambda$ through the sample 7 appears at the output of the detector 8 and is applied through the switch 11 to an amplifier 15 to be amplified thereby and the amplified signal is applied to a display means 16 such as a recorder to be displayed thereon. When it is desired to display the light absorption coefficient, a logarithmic converter 30 may be interposed between the amplifier 15 and the display means 16 so as to carry out the conversion of the light transmission coefficient into the light absorption coefficient. The two electrical signals representative of the light transmission coefficients are compared with each other in the manner above described so that a differential spectrum is displayed on the display means 16.

Figure 3:
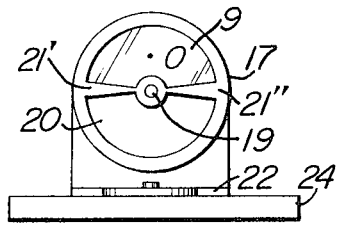
FIG. 3 is a schematic front elevation of means for driving a transparent plate shown in FIG. 1.
Figure 4:
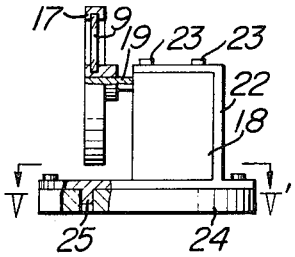
FIG. 4 is a partly sectional side elevation of the drive means shown in FIG. 3.
Figure 5:
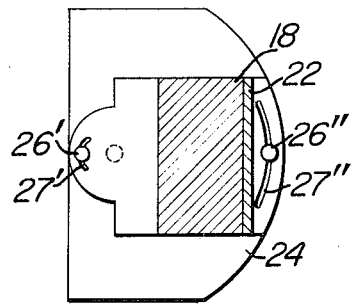
FIG. 5 is a section taken on the line V — V' in FIG. 4.

FIGS. 3, 4 and 5 show the structure of means for driving the transparent plate 9. A circular frame 17 for supporting the transparent plate 9 is directly connected to a rotary shaft 19 of a motor 18 to be driven thereby. The transparent plate 9 is supported in one of the half portions of the supporting frame 17, while the remaining half portion of the supporting frame 17 is in the form of a void portion 20, and a pair of opaque non-reflective portions 21' and 21'' are formed between these half portions. The symbol 0 designates the position of the light beam. The motor 18 is secured to a motor mounting frame 22 by screws 23, and this motor mounting frame 22 is supported on a base 24 so as to be swingable around a pivot pin 25. Locking screws 26' and 26'' are used to lightly secure the motor mounting frame 22 to the base 24 and are screwed into the base 24 through respective arcuate slots 27' and 27'' formed in the lower part of the motor mounting frame 22.

In response to the operation of the motor 18, the supporting frame 17 connected directly to the rotary shaft 19 is rotated so that the transparent plate 9 supported by the supporting frame 17 cuts periodically across the light beam passing through the point 0. Due to the presence of the opaque non-reflective portions 21' and 21'' between the transparent plate 9 and the void portion 20 in the arrangement shown in FIGS. 3 to 5, the electrical signal corresponding to the transmission of the light having the wavelength $\lambda$ and the electrical signal corresponding to the transmission of the light having the wavelength $\lambda + \Delta\lambda$ or $\lambda - \Delta\lambda$ appear alternately at the output of the detector 8 with the signal of zero level interposed therebetween.

The difference in wavelength $\Delta\lambda$ can be varied by varying the thickness of the transparent plate 9 and/or the angle of incidence $i$. In the case of the arrangement shown in FIGS. 3 to 5, the locking screws 26' and 26'' may be released and the motor mounting frame 22 may be rotated by a very small amount around the pivot pin 25 for easily varying the angle of incidence $i$ of the light beam passing through the point 0 with respect to the transparent plate 9, thereby varying the difference in wavelength $\Delta\lambda$.

It will be apparent from the foregoing description that the present invention is advantageous over the prior art device in that it is less expensive than when two spectrometers are used, the difference in wavelength $\Delta\lambda$ can be maintained constant throughout the measurement, and this difference in wavelength $\Delta\lambda$ can be freely varied as required.

The difference in wavelength $\Delta\lambda$ can also be produced by an arrangement in which the transparent plate 9 is maintained continuously in the path of the light beam and suitable means are provided for causing a rocking oscillatory motion of the transparent plate 9 within a limited angular range around an axis perpendicular to the path of the light beam. However, this arrangement is disadvantageous in that the angle of incidence of the light beam with respect to the transparent plate 9, hence the difference in wavelength $\Delta\lambda$ cannot be maintained constant. It is apparent that the present invention above described obviates this disadvantage and can continuously maintain the difference in wavelength $\Delta\lambda$ constant.

The transparent plate 9 exhibits the same effect even when it is disposed in the path of the light beam entering the dispersing means 5 instead of disposing it in the path of the light beam leaving the dispersing means 5. Further, although the transparent plate 9 illustrated in FIGS. 3 to 5 is of a chopper type, it may be arranged for reciprocating movement in a direction normal to the direction of thickness thereof, or it may be arranged for rocking ossillatory motion around a point in a direction normal to the direction of thickness thereof. Furthermore, the objects of the present invention can also be attained by disposing the dispersing means 5 in the path of the light beam leaving the sample 7 instead of disposing it in the path of the light beam entering the sample 7.

Figure 6:
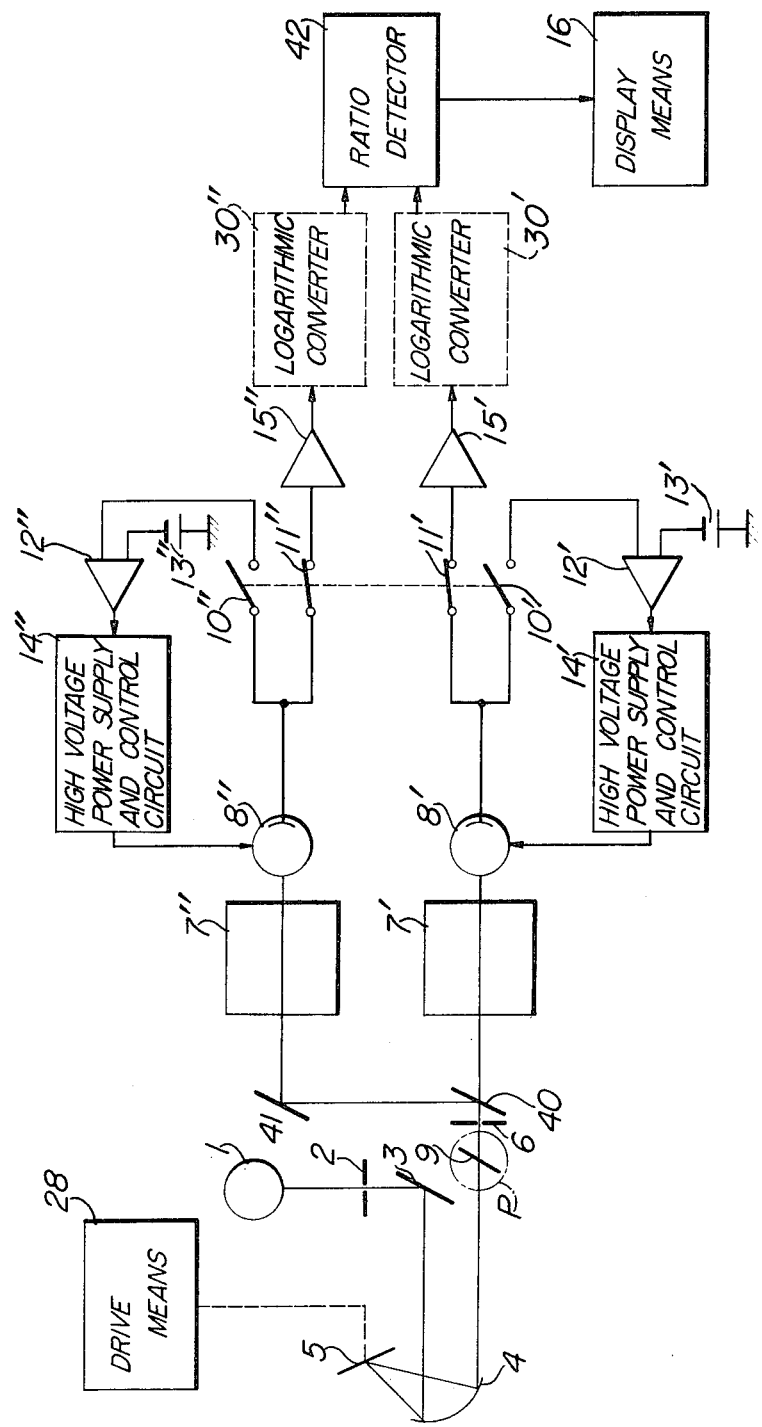
FIG. 6 is a diagrammatic view of another embodiment of the present invention.

FIG. 6 shows another embodiment of the present invention. The embodiment shown in FIG. 6 differs from the embodiment shown in FIG. 1 in that the former is of a double beam detection type, whereas the latter is of a single beam detection type.

Referring to FIG. 6 in which like reference numerals or those having dashes are used to denote like elements appearing in FIG. 1, the optical system includes a half-mirror 40 disposed in the path of the light beam leaving an exit slit 6 so as to divide the light beam into two beams. One of the light beams passes through a sample 7' to be examined and is detected by a detector 8', while the other light beam is reflected by a mirror 41 and passes through a reference sample 7" to be detected by a detector 8". The detectors 8' and 8" are connected to respective detection circuits which are similar to that shown in FIG. 1, and a ratio detector 42 is provided to compare the outputs (differentiated values) delivered from amplifiers 15' and 15". It is apparent that the arrangement for seeking the ratio between the outputs from the amplifiers 15' and 15" is advantageous in that the outputs from the amplifiers 15' and 15" are at least entirely similarly effected even if there were any variations in the radiation emanating from the light source 1 and the measurement is in no way adversely effected by such variations in the radiation. Logarithmic converters 30' and 30" may be provided as in the case of FIG. 1. In this case, it is needless to say that the ratio detector 42 must be replaced by a difference detector.

We claim:

1. A differential spectrophotometer comprising means for radiating a beam of light to be passed through a sample; photoelectric conversion means for detecting the light beam passed through the sample; means including a dispersing means for dispersing the light beam disposed at a first position in the path of the light beam from said light source toward said photoelectric conversion means through the sample so that a monochromatic light beam can be separated from said light beam to be detected by said photoelectric conversion means; means for selectively positioning a transparent plate at a second position in the path of the light beam from said light source toward said photoelectric conversion means through the sample so that said transparent plate can be disposed at an angle with respect to the light beam passing through said second position thereby producing a slight difference between the wavelength of the monochromatic light detected by said photoelectric conversion means when said transparent plate is disposed at said second position and the wavelength of the monochromatic light detected by said photoelectric conversion means when said transparent plate is not disposed at said second position; means for driving said dispersing means so that said dispersing means can scan the wavelength of said monochromatic light thereby alternately deriving from said photoelectric conversion means a first electrical signal representative of the absorption of the light by the sample when said transparent plate is in said second position and a second electrical signal representative of the absorption of the light by the sample when said transparent plate is not in said second position; and means for generating a third electrical signal representative of the difference or ratio between said first and second electrical signals.

2. A differential spectrophotometer as claimed in claim 1, in which means are provided for varying the angle of incidence of the light beam passing through said second position with respect to said transparent plate.

3. A differential spectrophotometer as claimed in claim 1, in which said means for selectively positioning said transparent plate at an angle with respect to the light beam passing through said second position includes means for causing movement of said transparent plate so that it cuts periodically across the light beam passing through said second position.

4. A differential spectrophotometer as claimed in claim 1, in which means are provided for varying the angle of incidence of the light beam passing through said second position with respect to said transparent plate, and said means for selectively positioning said transparent plate at an angle with respect to the light beam passing thorough said second position includes means for causing movement of said transparent plate so that it cuts periodically across the light beam passing through said second position.

5. A differential spectrophotometer comprising means for radiating a beam of light; means for dispersing the light beam thereby obtaining a monochromatic light beam; means for dividing the monochromatic light beam into a first and a second light beam so that the first and second light beams pass through a sample to be examined disposed in the path of the first light beam and a reference sample disposed in the path of the second light beam respectively; a first and a second detector for detecting the light beams passed through the respective samples; means for periodically bringing a transparent plate in the path of the light beam from said light source toward said light beam dividing means at an angle with respect to the light beam passing along the path thereby producing a slight difference between the wavelength of the light beam detected by said detectors when said transparent plate is in the path of the light beam and the wavelength of the light beam detected by said detectors when said transparent plate is out of the path of the light beam; means for driving said dispersing means so that said dispersing means can scan the wavelength of the light beam to be detected by said detectors thereby alternately deriving from each of said detectors a first electrical signal representative of the absorption of the light by the associated sample when said transparent plate is in the path of the light beam and a second electrical signal representative of the absorption of the light by the associated sample when said transparent plate is out of the path of the light beam; means for generating a third electrical signal representative of the difference or ratio between said first and second electrical signals appearing from one of said detectors; means for generating a fourth electrical signal representative of the difference or ratio between said first and second electrical signals appearing from the other said detector; and means for comparing said third electrical signal with said fourth electrical signal.

6. A differential spectrophotometer as claimed in claim 5, in which means are provided for varying the angle of incidence of the light beam passing along said path with respect to said transparent plate.

7. A differential spectrophotometer as claimed in claim 5, in which said means for periodically bringing said transparent plate in the path of the light beam at an angle with respect to the light beam passing along said path includes means for causing movement of said transparent plate so that it cuts periodically across the light beam passing along said path.

8. A differential spectrophotometer as claimed in claim 5, in which means are provided for varying the angle of incidence of the light beam passing along said path with respect to said transparent plate, and said means for periodically bringing said transparent plate in the path of the light beam at an angle with respect to the light beam passing along said path includes means for causing movement of said transparent plate so that it cuts periodically across the light beam passing along said path.

9. A differential spectrophotometer comprising:
first means for radiating a beam of light to be passed through a sample;
second means, responsive to the light beam passing through said sample, for detecting the light impinging thereon and generating a signal representative of the light detected;
third means, disposed at a first position in the path of the light beam irradiated by said first means, for dispersing said light beam toward said second means through said sample, so that a monochromatic beam can be separated from said light beam to be detected by said second means;
fourth means, disposed at a second position, in the path of the light beam from said first means toward said second means, for separating the light beam impinging thereon into first and second light beam components, having first and second respective wavelengths, the difference between which is constant, comprising means for selectively positioning a transparent plate at said second position in the path of the light beam at an angle with respect to the direction of the light beam passing through said second position, thereby producing a constant difference between the wavelength of the monochromatic light detected by said second means when said transparent plate is disposed at said second position and the wavelength of the monochromatic light detected by said second means, when said transparent plate is not disposed at said second position;
fifth means, coupled to said third means, for driving said third means, so that said third means can scan the wavelength of said monochromatic light, thereby alternately deriving from said second means, a first electrical signal representative of the absorption of the light by the sample, when said transparent plate is at said second position and a second electrical signal, representative of the absorption of the light by the sample, when said transparent plate is not in said second position; and
sixth means, coupled to said second means, for generating a third electrical signal representative of the difference or ratio between said first and second electrical signals.

10. A differential spectrophotometer according to claim 9, wherein said fourth means comprises means for rotating said transparent plate about an axis perpendicular to the surface of the plate upon which light is incident, whereby said angle is maintained constant during the rotation of said plate.

* * * * *